(12) United States Patent
Chen

(10) Patent No.: US 7,200,083 B2
(45) Date of Patent: Apr. 3, 2007

(54) SPEED CONTROL METHOD FOR RECORDING DATA ON AN OPTICAL DISK

(75) Inventor: Ling-Feng Chen, Taipei (TW)

(73) Assignee: Lite-On It Corporation, Neihu, Taipei City (TW)

(*) Notice: Subject to any disclaimer, the term of this patent is extended or adjusted under 35 U.S.C. 154(b) by 366 days.

(21) Appl. No.: 10/710,173

(22) Filed: Jun. 23, 2004

(65) Prior Publication Data

US 2005/0007907 A1    Jan. 13, 2005

(30) Foreign Application Priority Data

Jul. 9, 2003    (TW) ................................ 92118654 A

(51) Int. Cl.
*G11B 5/09*    (2006.01)
(52) U.S. Cl. ............... 369/47.4; 369/47.36; 369/47.38; 369/53.43
(58) Field of Classification Search ............... None
See application file for complete search history.

(56) References Cited

U.S. PATENT DOCUMENTS

2002/0131350 A1 *  9/2002  Kurobe et al. ............. 369/47.4

* cited by examiner

*Primary Examiner*—Muhammad Edun
(74) *Attorney, Agent, or Firm*—Winston Hsu

(57) ABSTRACT

A speed control method used in an optical disk drive for recording data onto an optical disk includes the following steps: detecting an allowable maximum recording speed of the optical disk and an allowable minimum recording speed of the optical disk, calculating a rotation speed of the optical disk according to the allowable maximum recording speed of the optical disk at an outermost region of the optical disk, calculating a critical position of the optical disk according to the allowable minimum recording speed at the rotation speed, and recording data onto the optical disk at the allowable minimum recording speed between an initial data position of the optical disk and the critical position of the optical disk.

10 Claims, 5 Drawing Sheets

SPEED CONTROL METHOD FOR RECORDING DATA ON AN OPTICAL DISK

BACKGROUND OF INVENTION

1. Field of the Invention

The present invention relates to a speed control method for recording data on an optical disk, and more particularly, to a speed control method for recording data on a rewritable optical disk.

2. Description of the Prior Art

Generally speaking, in a recordable optical disk drive, there are several speed control methods of recording data on an optical disk (CD-R or CD-RW).

(1) Constant Linear Velocity, CLV:CLV means that the optical disk is controlled such that a track length passing by an optical pickup head per unit time is constant. That is to say, when the optical pickup head accesses the inner region of an optical disk, a spindle motor rotates faster. On the contrary, when the optical pickup head accesses the outer region of an optical disk, the spindle motor rotates slower. Under the control of CLV, the rotation speed of the spindle motor is related to the position of the pickup head relative to the optical disk. That is, when the optical pickup head is moving from the inner to the outer region of the optical disk, the rotation speed of the spindle motor is gradually slowing down. Generally, a 1× optical disk drive is defined as the relative velocity between the optical pickup head and the optical disk being from 1.2 m/s to 1.4 m/s with 4.3218 MB/s data transmission rate. Other optical disk drives with higher speeds are defined as integer multiples of the above values, such as 2×, 4×, 8×, 16×, 20×, etc.

The advantages of CLV are as follows. (1) The data transmission rate is steady so that data can be written onto the optical disk with the steady laser beam power for ensuring writing quality. (2) The average data transmission rate is high. However, the disadvantages of CLV are as follows. (1) The service life of the spindle motor is short due to the variable rotation speed according to the position of pickup head relative to the optical disk. (2) If the data transmission rate is too high, the rotation speed of the spindle motor cannot keep up with the transmission rate especially at the inner region of the optical disk.

(2) Constant Angular Velocity, CAV:CAV means that the rotation speed of the spindle motor is constant. When the rotation speed of the spindle motor is constant, the data transmission rates at the inner and the outer regions of the optical disk differ substantially. In other words, when the optical pickup head accesses the inner region of the optical disk, the data transmission rate is lower; on the contrary, when the optical pickup head accesses the outer region of the optical disk, the data transmission rate is higher.

The advantages of CAV are as follows. (1) The service life of the spindle motor is long due to the constant rotation speed of the spindle motor. (2) The data transmission rate of CAV is higher than the data transmission rate of CLV in the random access case because the rotation speed of the spindle motor of CAV is constant and the rotation speed of the spindle motor of CLV is variable. The drawbacks of CAV are as follows. (1) The laser power is altered according to the variable data transmission rate, thus the writing quality is not easily controlled. (2) The average data transmission rate is low.

(3) Zoned Constant Linear Velocity, ZCLV:ZCLV means that the optical disk is divided into several regions from the inner to the outer region and the transmission rate of individual region is constant as in CLV. ZCLV is a combination of CLV and linking technology. Please refer to FIG. 1. FIG. 1 is a diagram of data transmission rate versus position of an optical disk when performing data writing under ZCLV in the prior art (the unit defining the position of the optical disk is time). In this case, the optical disk is divided into three zones. Before the time point T1 (region 1), the data transmission rate is 16× for performing data writing. Between the time points T1 and T2 (region 2), the data transmission rate is 20× for performing data writing. And after the time T2 (region 3), the data transmission rate is 24× for performing data writing. When changing from a region to another region, super-link technology is used to connect the two regions with different data transmission rates. That is, the writing process can be interrupted and be restarted with the super-link technology. Therefore, there are zone link situations at the time points T1 and T2.

ZCLV improves the drawback of CLV that if the data transmission rate is too great, the rotation speed of the spindle motor cannot keep up with the transmission rate, and keeps an advantage of CLV, which is that the transmission rate is steady. However, ZCLV still cannot improve the short service life of the spindle motor, one of the drawbacks of CLV, and ZCLV has lower average transmission rate compared with the average transmission rate of CLV.

(4) Partial Constant Angular Velocity, PCAV:PCLV means that the data transmission rate is increasing as the movement of the pickup head from inner region to outer region of the optical disc until the data transmission rate reaches the highest data transmission rate that the disc allowed or the highest data transmission rate that the optical disc drive provides, and the data transmission rate will be maintained at a constant value that equals to the highest speed. Please refer to FIG. 2. FIG. 2 is a diagram of data transmission rate versus position of an optical disk when performing data writing under PCAV in the prior art (the unit defining the position of the optical disk is time). In this case, the optical disk is divided into a CLV region and a CAV region with the time point T4 of the optical disk. Before the time point T4, the spindle motor provides a constant rotation speed; therefore, the initial data transmission rate is 4×. And the data transmission rate increases to 10× when the optical pickup head reaches the T4 position of the optical disk. After the time point T4, the data transmission rate stays at 10× CLV for performing data writing.

PCLV keeps advantages of CAV and overcomes an disadvantage of CAV, namely that the low average transmission rate. In addition, performing data writing under PCAV can increase the rotation speed of the spindle motor and prevent zone-link due to switching the data transmission rate under ZCLV.

Recording speed of a rewritable optical disk is often limited within a range, such as from 1× to 4× or from 12× to 24×, due to disk process. When performing data writing under CAV, the ratio of the data transmission rate at the inner region to the data transmission rate at the outer region is 1:2.4. In other words, as to a rewritable optical disk with a maximum data transmission rate 24×, the data transmission rate in the inner region is 10×. However if the allowable minimum data transmission rate of the rewritable optical disk is 12×, the data writing quality will be reduced within the data transmission rate range of 10× to 12×. Thus, performing data writing on some rewritable optical disks under CAV reduces the data writing quality.

SUMMARY OF INVENTION

It is therefore a primary objective of the claimed invention to provide a speed control method for recording data onto an optical disk to solve the above-mentioned problems.

According to the claimed invention, a speed control method of an optical disk drive for recording data onto an optical disk includes the following steps: detecting an allowable maximum recording speed of the optical disk and an allowable minimum recording speed of the optical disk, calculating a rotation speed of the optical disk according to the allowable maximum recording speed of the optical disk at an outermost region of the optical disk, calculating a critical position of the optical disk according to the allowable minimum recording speed at the rotation speed, and recording data onto the optical disk at the allowable minimum recording speed between an initial data position of the optical disk and the critical position of the optical disk.

According to the claimed invention, a speed control method of an optical disk drive for recording data onto an optical disk includes the following steps: detecting an allowable maximum recording speed of the optical disk and an allowable minimum recording speed of the optical disk, comparing a data recording speed at an initial data position of the optical disk under a first mode with the allowable minimum recording speed of the optical disk, calculating a critical position of the optical disk at the allowable minimum recording speed if the data recording speed is less than the allowable minimum recording speed, and recording data onto the optical disk at the allowable minimum recording speed between the initial data position of the optical disk and the critical position of the optical disk.

According to the claimed invention, a speed control method of an optical disk drive for recording data onto an optical disk includes the following steps: dividing the optical disk into a first region and a second region by a time point, recording data onto the first region of the optical disk under a constant linear velocity mode, and recording data onto the second region of the optical disk under a first mode so that a data recording speed at a terminal data position of the optical disk is a first recording speed.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
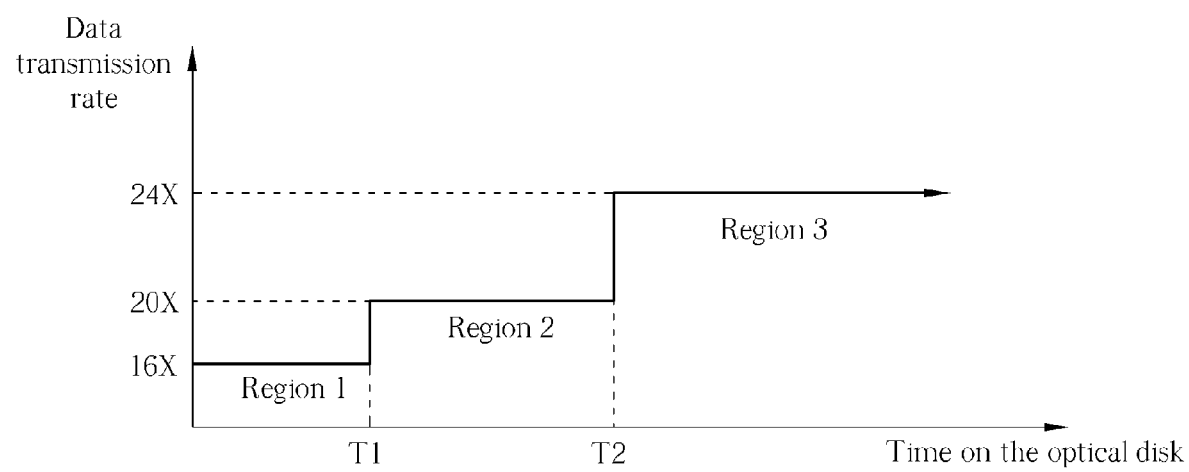
FIG. 1 is a diagram of data transmission rate versus position on an optical disk when performing data writing under ZCLV in the prior art.
Figure 2:
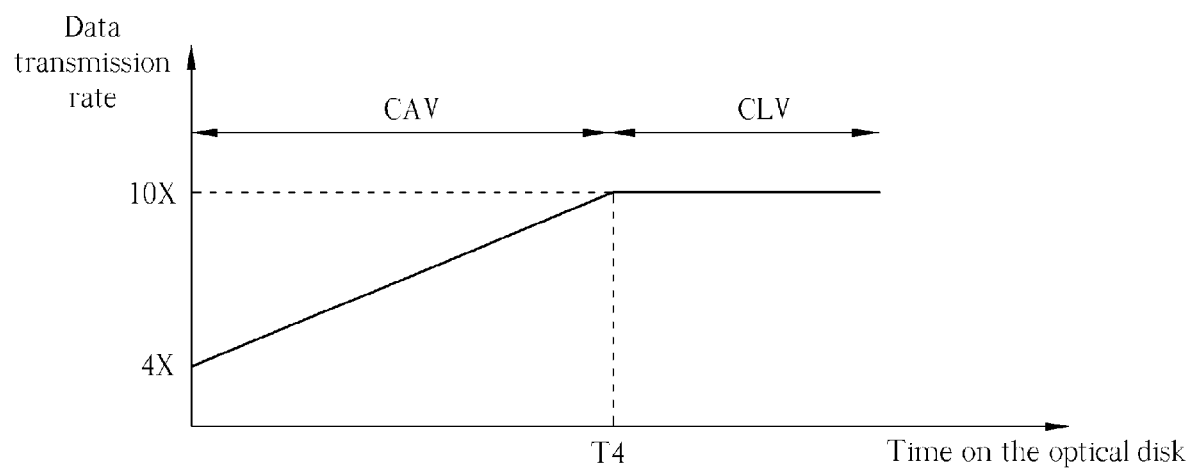
FIG. 2 is a diagram of data transmission rate versus position on the optical disk when performing data writing under PCAV in the prior art.
Figure 3:
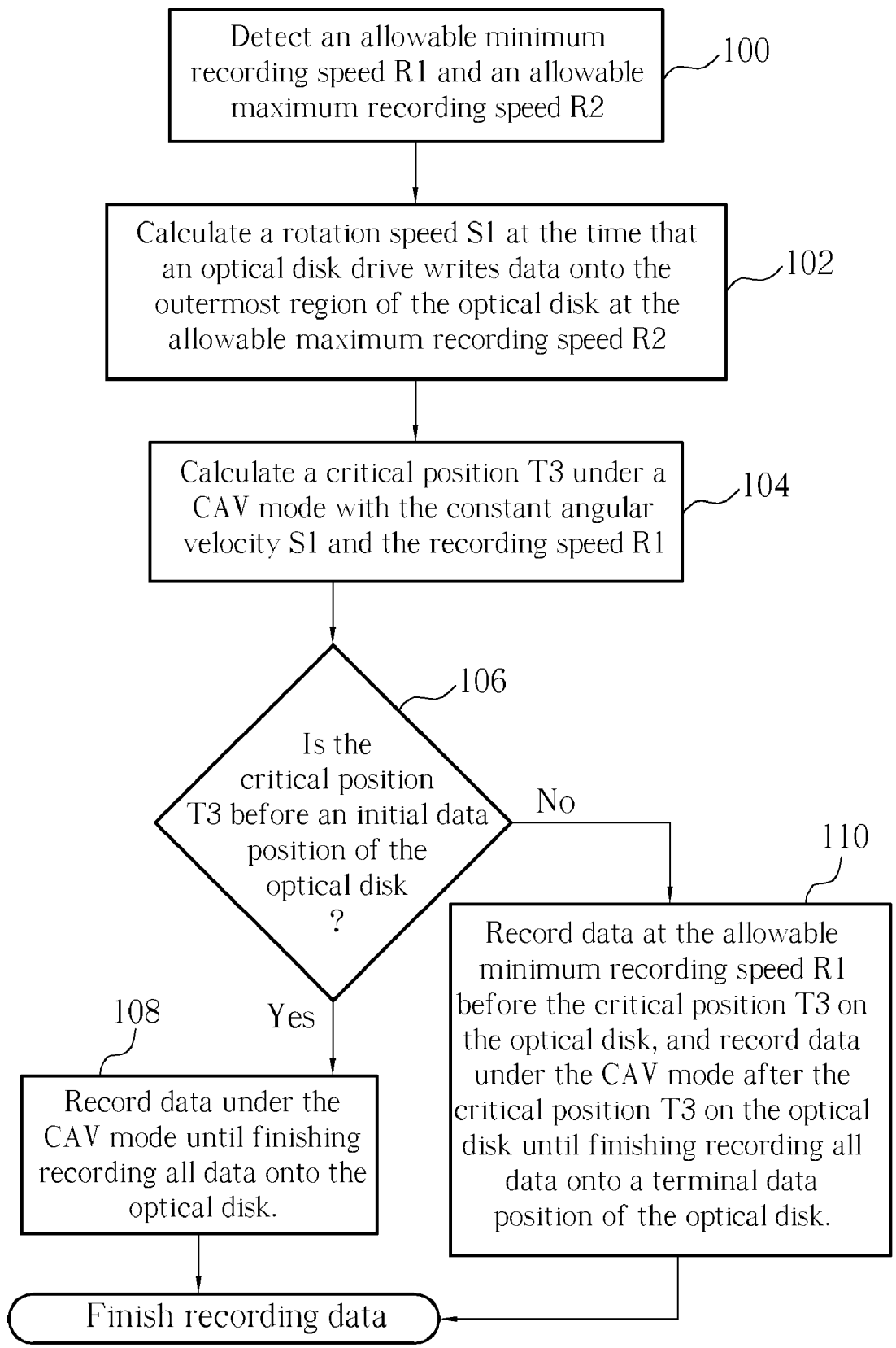
FIG. 3 is a flowchart according to the present invention.

Please refer to FIG. 3. FIG. 3 is a flowchart according to the present invention. The method includes the following steps:

Step 100: Detect an allowable minimum recording speed R1 of an optical disk and an allowable maximum recording speed R2 of the optical disk.

Step 102: Calculate a rotation speed S1 of the optical disk at the time that an optical disk drive writes data onto the outermost region of the optical disk at the allowable maximum recording speed R2.

Step 104: Calculate a critical position T3 under a CAV mode with the constant angular velocity S1 and the recording speed R1.

Step 106: Is the critical position T3 before an initial data position of the optical disk? If yes, go to step 108; otherwise, go to step 110.

Step 108: Record data at the allowable minimum recording speed R1 before the critical position T3 on the optical disk, and record data under the CAV mode after the critical position T3 on the optical disk until finishing recording all data onto a terminal data position of the optical disk.

Step 110: Record data under the CAV mode until finishing recording all data onto the optical disk.

Figure 4:
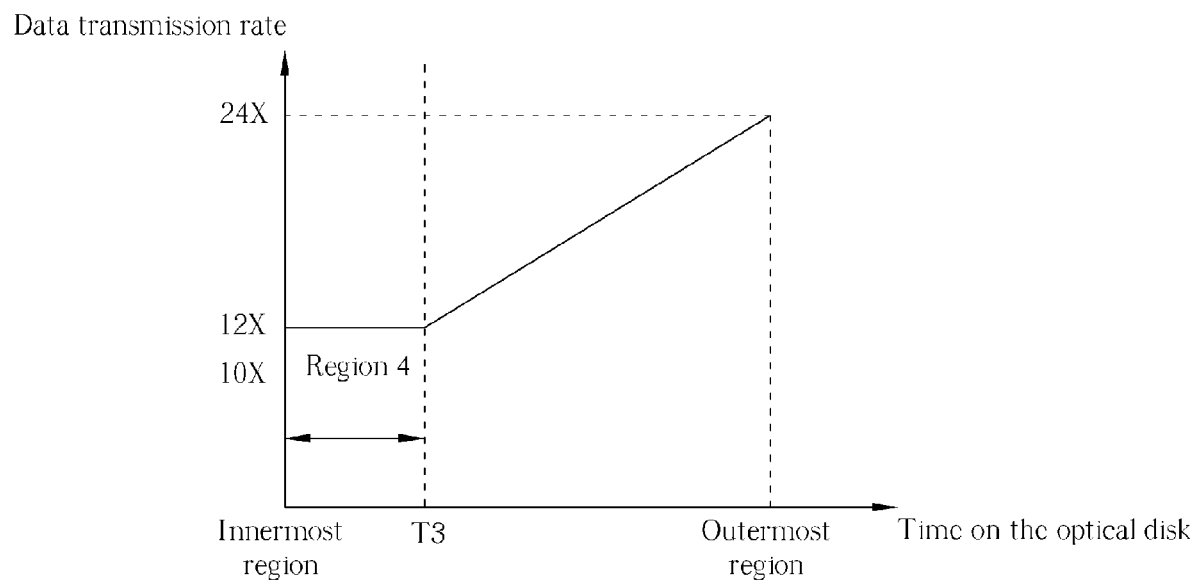
FIG. 4 is a diagram of data transmission rate versus position on the optical disk according to the present invention.
Figure 5:
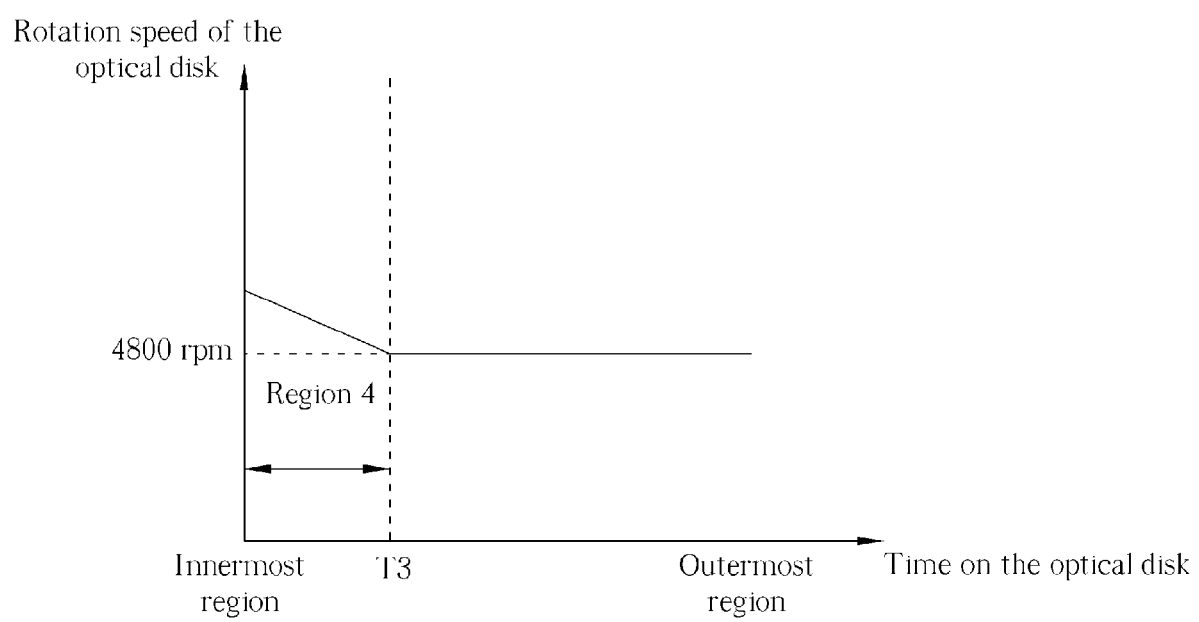
FIG. 5 is a diagram of rotation speed of the optical disk versus position on the optical disk according to the present invention.

Please refer to FIG. 4 and FIG. 5. FIG. 4 is a diagram of data transmission rate versus position of the optical disk according to the present invention, and FIG. 5 is a diagram of rotation speed of the optical disk versus position of the optical disk according to the present invention. In the embodiment of the present invention, the allowable recording speed of the optical disk ranges between 12× and 24×. As shown in FIG. 4, the optical disk drive writes data onto the outermost region of the optical disk at the allowable maximum recording speed 24×, and at that time the optical disk rotates at 4800 rpm as shown in FIG. 5. If performing data writing under the CAV mode, the recording speed of the critical position T3 is 12×, and at the inner region of the optical disk the data transmission rate is 10× for performing data recording. However due to the limitation of the allowable recording speed of the optical disk, that is, the minimum allowable recording speed of the optical disk being 12× (greater than the data transmission rate 10× before the critical position T3 (region 4)), the data transmission rate in region 4 is increased to 12× for performing data recording and the rotation speed of the optical disk is also increased in the region 4 so that before the critical position T3 (region 4) data recording is performed under a CLV mode. The recording speed in the region 4 only varies from 10× to 12×, and the variation of the rotating speed of the optical disk is slight. Therefore the present invention keeps advantages of CAV and maintains the data recording speed within the allowable recording speed range by performing data recording in region 4 under CLV mode.

There are other embodiments to achieve the present invention. For example, the data recording speed at the initial data position of the optical disk can be calculated when the optical disk drive writes data on the outermost region of the optical disk at the allowable maximum recording speed under CAV. If the data recording speed at the initial data position under CAV is less than the allowable minimum recording speed, a region A1 can be calculated so as to perform data recording at the allowable minimum recording speed on the region A1 of the optical disk. The data recording is performed under CAV outside the region A1 of the optical disk.

The preferred embodiment of the present invention performs data recording under CLV between the initial data position of the optical disk and the critical position of the optical disk so as to improve the limitation of data recording speed of the optical disk. In addition, the data recording is not limited to being performed under CAV outside the region A1 of the optical disk, and it also can be performed under PCAV, and so on. Besides, the constant linear velocity under the CLV mode is not limited to the allowable minimum recording speed of the optical disk. For example, the constant linear velocity can be slightly greater than the allowable minimum recording speed as long as the variation of the rotation speed of the optical disk is slight.

The optical disk drive used in the present invention can be a recordable optical disk drive, and the optical disk used in the present invention can be a CD-R disk or a CD-RW disk.

In contrast to the prior art, the present invention can improve the problem that the quality of performing data recording on a rewritable optical disk is reduced under CAV. Furthermore the variation of the rotation speed of a spindle motor is slight so that the recording quality can be upgraded and the service life of the spindle motor is not unnecessarily reduced.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A speed control method of an optical disk drive for recording data onto an optical disk, the method comprising:
   detecting an allowable maximum recording speed of the optical disk and an allowable minimum recording speed of the optical disk;
   calculating a rotational speed of the optical disk when recording data onto an outermost region of the optical disk with the allowable maximum recording speed of the optical disk;
   calculating a critical position of the optical disk wherewith the allowable minimum recording speed at the rotational speed; and
   recording data onto the optical disk with the allowable minimum recording speed between an initial data position of the optical disk and the critical position of the optical disk.

2. The method of claim 1 further comprising recording data onto the optical disk between the critical position of the optical disk and a terminal data position of the optical disk under a first mode so that the data recording speed at the terminal data position reaches the allowable maximum recording speed.

3. The method of claim 2 wherein the first mode is a constant angular velocity (CAV) mode.

4. The method of claim 2 wherein the first mode is a partial constant angular velocity (PCAV) mode.

5. The method of claim 1 wherein the optical disk is a CD-R disk or a CD-RW disk.

6. A speed control method of an optical disk drive for recording data onto an optical disk, the method comprising:
   detecting an allowable maximum recording speed of the optical disk and an allowable minimum recording speed of the optical disk;
   determining if a data recording speed at an initial data position of the optical disk under a first mode is less than the allowable minimum recording speed of the optical disk;
   calculating a critical position of the optical disk wherewith the allowable minimum recording speed if the data recording speed is less than the allowable minimum recording speed; and
   recording data onto the optical disk with the allowable minimum recording speed between the initial data position of the optical disk and the critical position of the optical disk.

7. The method of claim 6 wherein the first mode is a constant angular velocity (CAV) mode.

8. The method of claim 6 wherein the first mode is a partial constant angular velocity (PCAV) mode.

9. The method of claim 6 wherein the optical disk is a CD-R disk or a CD-RW disk.

10. A speed control method of an optical disk drive for recording data onto an optical disk, the method comprising:
    dividing the optical disk into a first region and a second region by a time point;
    recording data onto the first region of the optical disk under a constant linear velocity (CLV) mode;
    detecting an allowable maximum recording speed of the optical disk and an allowable minimum recording speed of the optical disk;
    recording data onto the second region of the optical disk under a first mode so that a data recording speed at a terminal data position of the optical disk is a first recording speed which is not greater than the allowable maximum recording speed of the optical disk
    wherein the time point is at a position wherewith the allowable minimum recording speed of the optical disk under the first mode.

* * * * *